United States Patent [19]

Spence, Jr.

[11] Patent Number: 5,422,155

[45] Date of Patent: Jun. 6, 1995

[54] COMPOSITE LAMINATED NOTEBOARD

[76] Inventor: Daniel D. Spence, Jr., 7053 Pineview Dr., Folsom, Calif. 95630

[21] Appl. No.: 154,094

[22] Filed: Nov. 18, 1993

[51] Int. Cl.$^6$ ............... B44F 1/10; B32B 1/04; B32B 3/20; B32B 29/00

[52] U.S. Cl. ............... 428/76; 428/27; 428/29; 428/313.5; 428/195; 428/537.1; 428/537.5; 283/117; 281/51; 434/425

[58] Field of Search ............... 428/23, 24, 25, 26, 428/29, 313.5, 195, 76, 537.1, 537.5; 283/117; 281/51; 434/408, 425

[56] References Cited

U.S. PATENT DOCUMENTS

| | | | |
|---|---|---|---|
| 2,717,187 | 9/1955 | Morgan et al. | 311/106 |
| 2,813,766 | 11/1957 | Shumaker et al. | 311/106 |
| 3,172,800 | 3/1965 | Truesdell | 108/150 |
| 3,223,056 | 12/1965 | Wilburn | 108/150 |
| 3,298,894 | 1/1967 | Barnette | 161/43 |
| 3,352,080 | 11/1967 | Rondum | 52/614 |
| 3,422,589 | 1/1969 | Harrison | 52/309 |
| 3,720,027 | 3/1973 | Christensen | 52/309 |
| 4,333,288 | 6/1982 | Coombs | 52/311 |
| 4,420,920 | 12/1983 | Hewitt | 428/34 |
| 4,478,415 | 10/1984 | Shaffer et al. | 52/802 |
| 4,678,206 | 7/1987 | Leahan | 40/334 |
| 5,173,324 | 12/1992 | Newhart | 427/11 |

Primary Examiner—George F. Lesmes
Assistant Examiner—Kathryne E. Shelborne
Attorney, Agent, or Firm—Richard C. Litman

[57] ABSTRACT

A laminated composite noteboard using smoothly finished, glossy surface plastic material for the surface laminate(s), provides an efficient and convenient writing or marking surface for writing or marking implements such as erasable felt tip pens and the like. The noteboard may include a core of a variety of materials, such as fiberboard, chipboard, or hard or soft wood plywood, and may use a variety of surface laminate sheets to provide the required smooth finish. The edges may be finished in a variety of ways, from the rounding or relieving of corners to eliminate sharp corners and edges, to sealing and/or installing decorative trim to preclude moisture absorption and warpage. The opposite or non-writing side of the noteboard is also preferably sealed, but may be sealed by using a second glossy finish overlay to provide two opposite writing surfaces, if desired. The noteboard may be provided in a variety of sizes, shapes and thicknesses, for hand held or lap top use on up to wall mounted units for classroom use. A larger board may also provide utility as a projection screen.

7 Claims, 2 Drawing Sheets

COMPOSITE LAMINATED NOTEBOARD

FIELD OF THE INVENTION

The present invention relates generally to erasable and reusable boards providing for the inscription of indicia thereon, and more specifically to a laminated board being smooth, glossy and highly polished on one or both surfaces and a central core of wood or other material therebetween. The noteboard may be used with writing or marking implements such as erasable marking pens, and may be provided in a variety of sizes from handheld to wall mounted, depending upon the specific need. Methods of construction of the board are also disclosed.

BACKGROUND OF THE INVENTION

Traditional classroom education has relied entirely upon the "blackboard" (either black or natural slate, or other materials and colors) and chalk as the medium for demonstrating concepts which can be portrayed graphically. While this technique is relatively messy due to the chalk dust and smaller pieces of broken chalk which result, the technology and materials are well known and no major advances have been provided in the field for decades. Typically, such boards are limited in the range of chalk colors they can accept, due to their relatively dark color and the difficulty in completely erasing chalk colors other than white. Due to the relatively dark colors of the traditional blackboard or chalkboard, they were unsuitable for use as projection screens and an additional projection screens were required for occasional use. This duplication of surfaces results in additional costs.

Much the same graphics technology can be used on a smaller scale, downward to hand held units, but the same drawbacks also apply here. On the other hand, the use of paper is wasteful and the partial erasure of a figure on paper can be difficult, as well as weakening or destroying the paper after numerous and/or vigorous erasures. A response to these problems has been the palmtop or laptop computer, but such units which provide graphics capability are relatively slow and costly for casual use.

The need arises for a noteboard which may be used in combination with an erasable marking pen(s) to provide the utility of a blackboard or chalkboard, thereby eliminating the mess of chalk dust and the difficulty of cleanup of multiple colors. The noteboard may be manufactured using a relatively inexpensive core material (chipboard, fiberboard, or plywood) and includes at least one plastic laminated surface overlay having a smooth, glossy finish capable of accepting markings from erasable marking pens and the like. Both sides of the noteboard may be laminated in a like manner, if desired, in order to provide a second usable surface in the event one surface becomes scratched or damaged. The noteboard must also provide for use in a variety of sizes, from wall mounted to hand held, and is preferably finished on the non-working side and edges in order to preclude moisture absorption and warpage. A decorative trim edge may also be installed thereabout, if desired.

DESCRIPTION OF THE PRIOR ART

U.S. Pat. No. 2,717,187 issued to Erving B. Morgan et al. on Sep. 6, 1955 discloses a Laminated Table Top With Edging. Multiple veneer overlays are disclosed, and the extension of the edge below the undersurface precludes the use of that surface.

U.S. Pat. No. 2,813,766 issued to Emery D. Shumaker et al. on Nov. 19, 1957 discloses a Table Top Construction in which a relatively heavy (1 to 1⅛ inch thick) plywood base is used, and a single sheet of plastic veneer overlay is applied to one surface thereof. The edges of the base are rounded by applying quarter round molding, and the plastic veneer is wrapped over the edge molding. Such construction is beyond the scope of the present invention, as the rounded surface is unsuitable for use as a noteboard.

U.S. Pat. No. 3,172,800 issued to Robert E. Truesdell on Mar. 9, 1965 discloses a Finishing Beading Or Molding applicable to panel edges and the like. No panel construction is disclosed.

U.S. Pat. No. 3,223,056 issued to William N. Wilson on Dec. 14, 1965 discloses a Table Construction using a molded resin compound to form an edge thereon. The table is disclosed to include a multitude of laminate layers in the core. The Truesdell disclosure is beyond the scope of the present invention.

U.S. Pat. No. 3,298,894 issued to Stanley R. Barnette on Jan. 17, 1967 discloses a Plastic Article With Enveloped Core. The disclosure relates to the manufacturing technique used in making such an enveloped core. The core is completely encapsulated on all sides and edges, unlike the present noteboard.

U.S. Pat. No. 3,352,080 issued to Svend B. Rondum on Nov. 14, 1967 discloses a Laminated Countertop And Method Of Producing The Same. The core has only a single veneer layup on the upper surface and may include multiple sections, unlike the present noteboard.

U.S. Pat. No. 3,422,589 issued to George C. Harrison on Jan. 21, 1969 discloses a Construction Of Lapped Panels Having Flexible Edge Portions. The invention includes a relatively rigid panel having a flexible plastic overlay on one side and extending from one edge thereof. The panels are used as siding or shingles, with the flexible extension being folded under during construction to provide a sealed joint beneath each overlapping panel.

U.S. Pat. No. 3,720,027 issued to Poul S. Christensen on Mar. 13, 1973 discloses a Floor Structure particularly adapted to use in ice rinks and the like. Each panel core is completely encapsulated in plastic, unlike the present noteboard, and rests on a resilient padding secured to one side. Moreover, each panel includes mating locking means along the edges providing for joining to other like panels.

U.S. Pat. No. 4,333,288 issued to Donald W. Coombs on Jun. 8, 1982 discloses Beveled Edge Trim for tables and the like. The structure and method of manufacture thereof is applicable only to the panel edge; no disclosure is made of the remaining structure. It is noted, however, that the panel is shown to be covered on only a single side with an overlay sheet.

U.S. Pat. No. 4,420,920 issued to Michael J. Hewitt on Dec. 20, 1983 discloses Cored Plastics Profiles And Manufacture Of Frames For Windows And The Like Therefrom. The core is completely sealed and encapsulated within an extruded plastic coating, unlike the present noteboard. Also, means are provided for attachment or cooperation with adjacent structures or like articles, unlike the present invention.

U.S. Pat. No. 4,478,415 issued to Dale A. Shaffer et al. on Oct. 23, 1984 discloses an Encapsulated Basketball Backboard. Only one embodiment discloses complete encapsulation, and that embodiment discloses overlapping edges for the overlay, unlike the present noteboard.

U.S. Pat. No. 4,503,780 issued to Arthur A. Apissomian on Mar. 12, 1985 discloses a Table With Resilient Edge. The disclosure is primarily directed to a method of stretching the resilient edge around the perimeter of the panel. No disclosure is made of the use of laminate overlays on the panel, and thus the disclosure is beyond the scope of the present noteboard.

U.S. Pat. No. 4,570,410 issued to Wilhelm Tuneke et al. on Feb. 18, 1986 discloses a Composite Plate And Method Of Making Same comprising cutting off the finished edge and wedging it upward to form a slightly raised panel edge. The non-symmetrical nature of the resulting edge is unlike the present invention.

U.S. Pat. No. 4,610,119 issued to Leigh R. Bench, Sr. on Sep. 9, 1986 discloses a Laminated Door To Withstand Vandalism And Method Of Manufacture Thereof. The door is laminated with a sheet of polycarbonate material on each side. However, the core material remains unsealed along the edges, thus permitting water absorption and subsequent damage, unlike the present noteboard.

U.S. Pat. No. 4,689,102 issued to John Prawdzik et al. on Aug. 25, 1987 discloses a Method For The Production Of Abrasion-Resistant Decorative Laminates. The disclosure is primarily directed to the bonding of a release sheet to the core substrate, and the provision of an abrasion resistant decorative laminate thereon. No relationship is seen to the present invention.

U.S. Pat. No. 4,748,780 issued to Knud Vinther on Jun. 7, 1988 discloses Composite Panels And Methods Of Making Composite Panels. The disclosure is limited to the formation and installation of the edge trim of a panel, rather than to the panel itself, and each embodiment requires a plurality of specially shaped edge trim pieces and other components.

U.S. Pat. No. 4,942,084 issued to Kendall W. Prince on Jul. 17, 1990 discloses Reconstituted Wood Veneer Covered Structural Elements. The elements are directed toward use as venetian blind slats or the like, and consequently the substrate is relatively thin (slightly over ⅛ inch thick). The decorative overlay on either side is formed of a reconstituted wood veneer, unlike the present noteboard. The Prince construction would be too flexible and insufficiently durable for use as a noteboard, nor would the reconstituted wood surface be suitable.

U.S. Pat. No. 4,954,382 issued to R. Scott Riefler on Sep. 4, 1990 discloses an Interleaf Layer In Fiber Reinforced Resin Laminate Composites. The panel formed thereby includes a thermoplastic core, or a honeycomb ply with thermoplastic cores on each side, unlike the present invention. No provision is made for a smooth, glossy surface finish or for edge trim.

U.S. Pat. No. 5,089,348 issued to Lauren G. Louderback on Feb. 18, 1992 discloses a Precured Laminate Overlay for use in constructing concrete forms. The disclosed laminates are all asymmetrical in those embodiments having more than two layers, and no edge finishing is disclosed. While Louderback discloses relatively smooth and finished surfaces, it will be seen that the surfaces disclosed do not approach the glossy finish required with the present invention.

Finally, U.S. Pat. No. 5,187,000 issued to Suezone Chow et al. on Feb. 16, 1993 discloses a Cellulosic Construction Panel formed of a substrate having a polyolefin layer on one surface and veneer or kraft paper on the opposite surface. The purpose of the layer is to provide a smoother finished surface, but again the surface finish would not be comparable to the glossy finish required for the present noteboard, as in the case of Louderback above. Also, no edging is disclosed by Chow et al.

None of the above noted patents, taken either singly or in combination, are seen to disclose the specific arrangement of concepts disclosed by the present invention.

SUMMARY OF THE INVENTION

By the present invention, an improved laminated composite noteboard is disclosed.

Accordingly, one of the objects of the present invention is to provide an improved noteboard which includes at least one smooth, glossy and highly polished surface providing for the marking thereon with an erasable marking pen or the like.

Another of the objects of the present invention is to provide an improved noteboard which contains a central core material of chipboard, fiberboard, plywood, or other similar material to provide the required strength, durability, and economy.

Yet another of the objects of the present invention is to provide an improved noteboard which includes complete sealing of the central core material by means of a varnished or otherwise sealed kraft paper backing on one side of the central core, a polished overlay on the opposite side, and a varnished or otherwise sealed edge thereabout.

Still another of the objects of the present invention is to provide an improved noteboard which provides for two opposite writing surfaces by installing a smoothly polished and glossy overlay on each surface.

A further object of the present invention is to provide an improved noteboard which includes rounded or relieved edges and corners in order to reduce the likelihood of injury thereon.

An additional object of the present invention is to provide an improved noteboard which may be provided in a variety of sizes and thicknesses, for use from hand-held or laptop functions to wall mounted classroom functions.

A final object of the present invention is to provide an improved noteboard for the purposes described which is inexpensive, dependable and fully effective in accomplishing its intended purpose.

With these and other objects in view which will more readily appear as the nature of the invention is better understood, the invention consists in the novel combination and arrangement of parts hereinafter more fully described, illustrated and claimed with reference being made to the attached drawings.

BRIEF DESCRIPTION OF THE DRAWINGS

Similar reference characters denote corresponding features consistently throughout the several figures of the attached drawings.

DETAILED DESCRIPTION OF THE PREFERRED EMBODIMENTS

Figure 1:
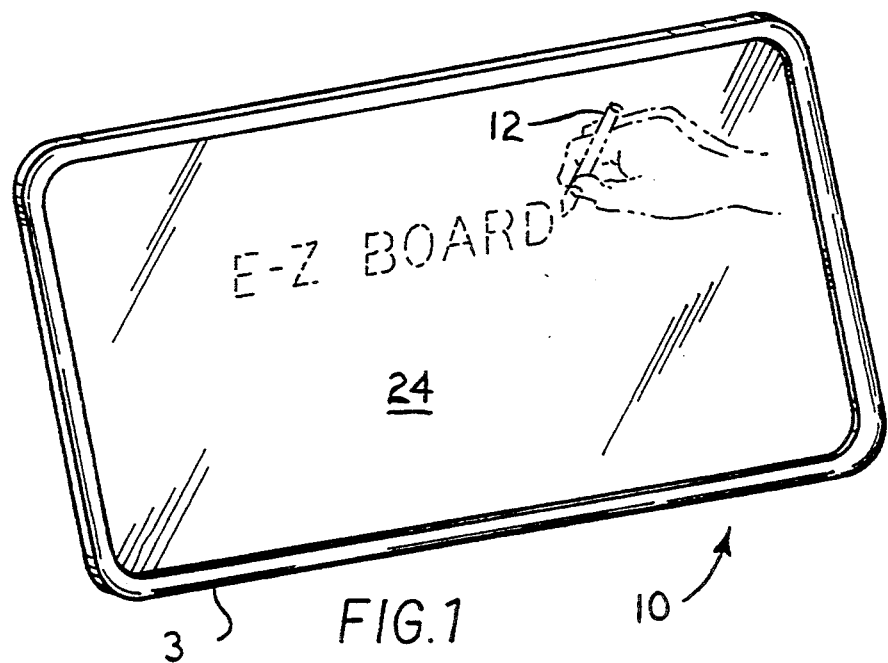
FIG. 1 is a perspective view of the laminated composite noteboard of the present invention, showing its use.
Figure 2:
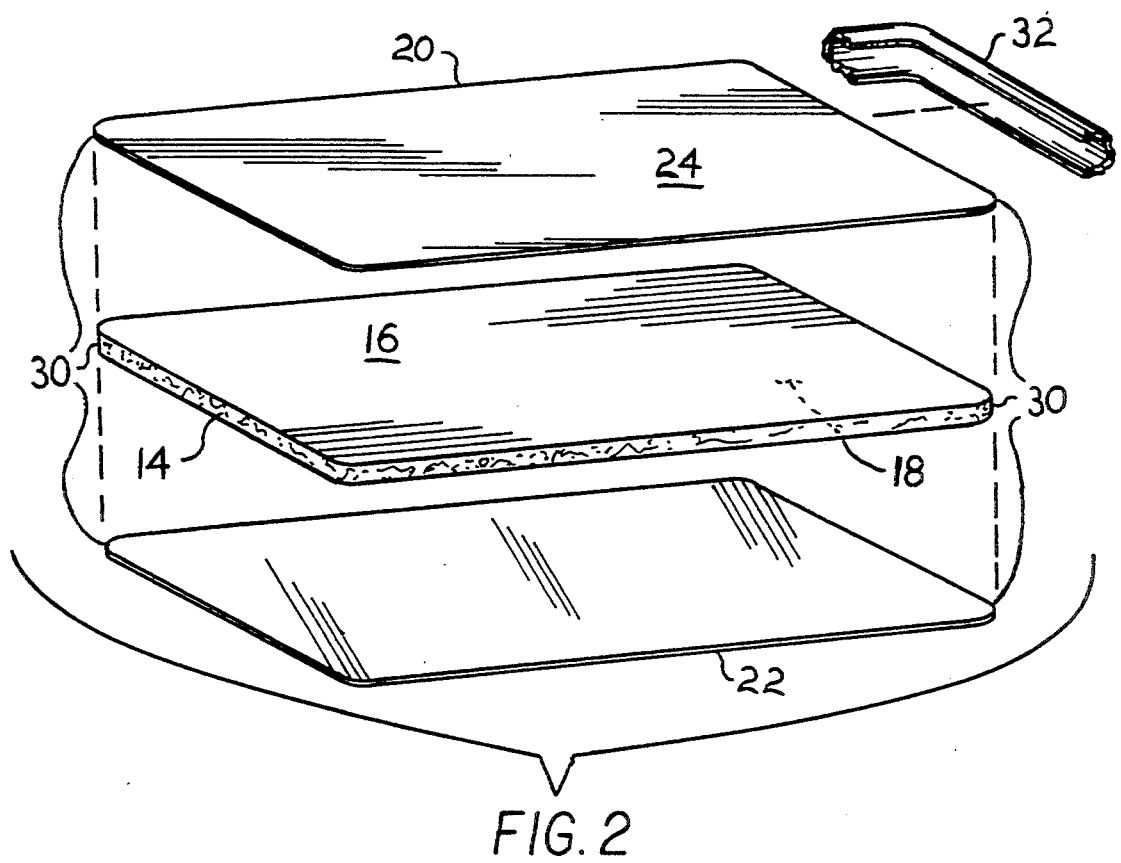
FIG. 2 is an exploded perspective view of the noteboard, showing its construction.

Referring now particularly to FIGS. 1 and 2 of the drawings, the present invention will be seen to relate to a laminated composite noteboard 10 providing for the inscription of indicia and graphics thereon by means of a marker 12 (preferably comprising an erasable colored marking pen). Noteboard 10 comprises a central core or substrate 14, preferably formed of a processed wood product such as fiberboard, chipboard, or particle board, or the plywood laminates 14a shown in FIG. 3. The central core 14 or 14a will be seen to have a first surface 16 and an opposite second surface 18, to which a first and/or second overlay 20 and/or 22 may be adhesively secured.

The first overlay 20 includes an outwardly facing working surface 24, having a highly smooth and glossy finish. The high gloss finish of the working surface 24 of the first overlay 20 provides for the erasable marking thereon by an erasable marking pen 12 or the like. The smoothness of the surface 24 precludes colored marker residue being captured or trapped within pores and fine discontinuities in the surface, thereby providing for complete erasure of any markings thereon when desired. Overlay 20 is preferably formed of a relatively hard, phenolic plastic (e.g., melamine), but may be formed of other suitable materials as desired or required.

Figure 3:
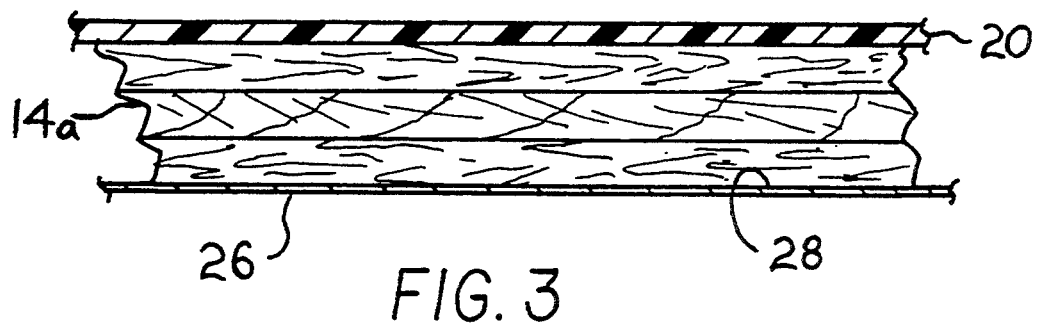
FIG. 3 is a broken away cross sectional view of another embodiment of the noteboard, showing a plywood core and single plastic laminate veneer writing surface overlay.

The second surface 18 of the central core 14 or 14a includes a protective overlay thereon, which overlay may be in the form of a second overlay 22 having a glossy and smooth outwardly facing working surface as in the manner of the first overlay 20 discussed above, or alternatively may take the form of a relatively thin phenolic or paper backing sheet 26 varnished or adhesively secured to the second surface 28 of the central core, as shown in FIG. 3. It will be understood that the assembly shown in FIG. 3, in which only a single smooth, glossy working surface is provided, may also be used in combination with the fiberboard, particle board or chipboard core 14 of FIG. 1, and the double sided working surface board shown in FIG. 2 may be applied to the plywood core 14a of FIG. 3, if desired.

Each of the cores 14 and 14a, and the overlay sheets 20, 22, 26, will be seen to have common, congruent peripheries when assembled. While the general shape of the board 10 shown in the drawing figures is rectangular, it will be seen that the present invention is adaptable to various shapes and is not limited to a rectangular noteboard 10. However, it is important that any edges or corners (e.g., corners 30) be relieved, radiused or otherwise shaped to remove any sharp edges and thus reduce the likelihood of injury thereon to a person using the noteboard 10. This operation can be performed after the core 14 or 14a and the first and second overlay sheets 20, 22 and/or 26, are adhesively secured together. The method of manufacture of the present noteboard 10 is discussed further below. In addition to or in lieu of the above peripheral shaping, a protective peripheral band 32 may be secured around the periphery of the assembled board 10, serving both to protect the users thereof and also the noteboard 10 periphery from damage.

FIG. 3 discloses the steps involved in the manufacture of the present noteboard 10. The first step 34 includes the laminating of the first and second overlay sheets 20, 22, and/or 26 to the central core 14 or 14a, as applicable. An adhesive gluing or bonding process may be used for this lamination step. Preferably, at least the first overlay sheet 20 is secured with its smooth, glossy working surface 24 facing outward, in order to provide the smooth writing or drawing surface required with the present notebook 10. However, the reverse or attachment surfaces of the overlays 20, 22 and/or 26 (and the surfaces 16 and 28 of the core 14 and/or 14a) may be provided with a roughened finish in order to provide a better adhesive surface for lamination.

Figure 4:
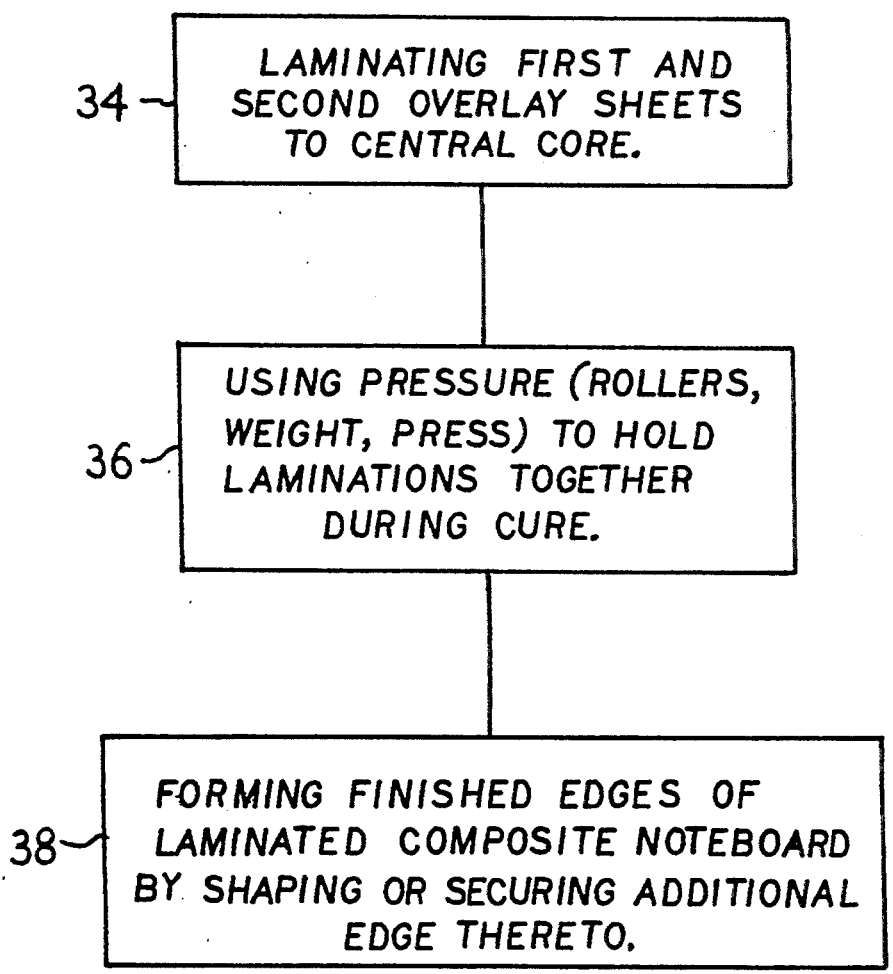
FIG. 4 is a block diagram showing the method of construction of the noteboard of the present invention.

Once the overlays 20, 22 and/or 26 have been adhesively secured to the core 14 and/or 14a, the various overlays and core are firmly pressed together during the adhesive curing process, as indicated at the step labeled 36 in FIG. 4. This may be accomplished by means of pinch rollers, a hydraulic or other type of press, or by weight applied to the noteboard(s) 10 during the curing process, as desired or required.

Finally, after the various sheets and core(s) have been secured together, the edges of the noteboard 10 may be finished by a routing or other machining process to form a smoothly rounded or other suitable edge. Alternatively, or in addition to, the above operation, a protective peripheral band 32 may be applied to the periphery of the assembled noteboard 10, if desired. This step of finishing the edge or periphery of the notebook 10 is shown as the third step (labeled as 38) in FIG. 4.

Accordingly, the above noteboard 10 will be seen to provide a suitable surface for use with erasable marking pens (e.g., marker 12) of various colors, thus providing for more eye catching and memorable indicia and graphic displays thereon. The ease of erasure and cleanup of the present noteboard, due to its glossy and smooth working surface(s) 24, provide a notable improvement over the old chalkboard technology. By providing two opposite polished working surfaces, the life of the present noteboard may be doubled when the first surface becomes abraded and is no longer easy to erase. While it is anticipated that most of the working surfaces 24 will be provided in white, it will be seen that they may be provided in a variety of colors (preferably relatively light or pastel colors), in order to complement the interior decor of a room in which they may be installed, particularly in the case of a relatively large noteboard 10. The light color and smooth surface finish provided, also serve well as a screen for projector use, this obviating the need for a separate projector screen for classroom or other use. The present notebook 10 may also be provided in a multitude of sizes, from relatively large, wall mounted units, to relatively small handheld or laptop units. While the thicknesses of the materials used may vary depending upon the size of the noteboard 10, the construction and manufacturing techniques disclosed herein are compatible with any of the noteboards 10 of the present invention.

It is to be understood that the present invention is not limited to the sole embodiments described above, but encompasses any and all embodiments within the scope of the following claims.

I claim:

1. A noteboard and marker kit including in combination:
    a laminated composite noteboard comprising a central core formed of a processed wood material and having a first side, an opposite second side, and a peripheral edge;

said central core first side having a high pressure laminate overlay adhesively secured thereto, with said high pressure laminate overlay having a smooth outwardly facing working surface of high gloss and polish and thereby providing means for the acceptance of erasably removable markings thereon;

said central core second side having a protective overlay adhesively secured thereto;

said high pressure laminate overlay and said protective overlay each including a peripheral edge congruent with said central core peripheral edge, and thereby defining a noteboard peripheral edge;

said noteboard peripheral edge being shaped to preclude potential injury to persons handling said noteboard, and sealed to preclude the entry of moisture therein and potential warping and damage to said noteboard, and;

a marker comprising at least one marking pen capable of providing erasably removable markings upon said high pressure laminate overlay, whereby;

said noteboard provides for the erasably removable application of indicia thereto by means of said marking pen being applied to said smooth outwardly facing working surface of high gloss and polish.

2. The noteboard and marker kit of claim 1 including:
a protective peripheral band disposed about said noteboard peripheral edge, whereby potential damage to said central core, said high pressure laminate overlay, and said protective overlay is alleviated.

3. The noteboard and marker kit of claim 1 wherein:
said protective overlay adhesively secured to said central core second side of said noteboard comprises a second high pressure laminate overlay having a smooth outwardly facing working surface of high gloss and polish, whereby two surfaces of said noteboard provide for the erasably removable application of indicia thereto by means of each said smooth outwardly facing working surface of high gloss and polish and said marking pen being applied thereto.

4. The noteboard and marker kit of claim 1 wherein:
said high pressure laminate overlay of said noteboard comprises a phenolic sheet material.

5. The noteboard and marker kit of claim 1 wherein:
said processed wood product of said central core of said noteboard comprises fiberboard.

6. The noteboard and marker kit of claim 1 wherein:
said processed wood product of said central core of said noteboard comprises chipboard.

7. The noteboard and marker kit of claim 1 wherein:
said processed wood product of said central core of said noteboard comprises plywood.

* * * * *